United States Patent Office 3,507,837
Patented Apr. 21, 1970

3,507,837
ACIDIC COMPOUNDS USED TO MODIFY CURING OF POLYMERS WITH MULTIAZIRIDINO COMPOUNDS
David C. Hidinger, Jr., Akron, Ohio, assignor to The General Tire & Rubber Company, a corporation of Ohio
No Drawing. Continuation-in-part of application Ser. No. 402,342, Oct. 7, 1964. This application Jan. 17, 1967, Ser. No. 609,767
Int. Cl. C08f 27/08
U.S. Cl. 260—78.4             10 Claims

ABSTRACT OF THE DISCLOSURE

Acidic compounds, such as Lewis acids, Bronsted acids, salts of weak bases and strong acids, etc., are used as promoters or catalysts in the curing of carboxyl containing polymers, e.g., carboxyl terminated polyalkadienes, carboxylic containing polyesters, etc., with multiaziridinyl hydrocarbons.

Cross-reference to related application

This application is a continuation-in-part of copending application Ser. No. 402,342, filed Oct. 7, 1964, now abandoned, the disclosure of which is incorporated herein by reference.

Background of the invention

Chemical modification of polymer materials into products of more complex chemical structure and higher molecular weight can proceed in a variety of ways. Such terms as "cross-linking," "chain-extending," "curing" and "vulcanizing" are used to describe such chemical modification of polymers. For the purpose of disclosing this invention, the term "curing" is used to generically refer to this type of chemical reaction. In this context, the invention concerns the curing of polymeric materials which contain a plurality of carboxyl groups, i.e., —COOH groups. Typical examples of such polymers are carboxyl terminated polybutadienes (U.S. 3,150,209) and carboxyl containing polyesters (U.S. 3,258,452).

Compounds containing the aziridinyl group, i.e.,

are known to be reactive with carboxyl group compounds, e.g., see J. Org. Chem. 9, 500 (1944). Consequently, aziridino compounds have been investigated and used for reaction with carboxyl containing polymers. Specifically, multiaziridino compounds, i.e., those containing a plurality of aziridinyl groups have been used in the curing of carboxyl containing polymers (U.S. 3,182,040).

Many varieties of multiaziridino compounds are known, e.g., polyaziridinyl phosphate esters (U.S. 3,226,-377), polyaziridinyl carbamates (U.S. 3,119,782), polyaziridinyl phosphonic acids (U.S. 2,654,738), polyaziridinyl triazines and a host of other multiaziridino compounds (U.S. 3,260,702).

The use of polyaziridinyl phosphorus compounds in the curing of carboxyl containing polymers (U.S. 2,915,480) has presneted difficulties because of insufficient cures and changes in physical properties of the cured polymers with passage of time. The cure rates of many known multiaziridino compounds when used in such curing operations has been reported as too slow and special types of multiaziridino compounds have been used in an attempt to improve the cure rate (U.S. 3,258,452).

The rate at which curing of carboxyl polymers with multiaziridino compounds is made to progress has now been found to require control dependent upon the required nature and end use of the final polymer product. Thus, in any event, it is desirable that the cure progress to substantial completion so the product will have good shelf-life, but that this completion of cure can be attained at a controllable rate. It has been found, for example, that a fast cure is advantageous in production of highly cross-linked resins where time and hardness are important as with potting compounds, sealants, etc. Conversely, slow cure and ensured completion of cure may be important with soft polymer products, e.g., binders for rocket propellants. This control of cure may, in part, be attained by combinations of selective multiaziridino compounds and, particularly special mixtures thereof, with carboxyl polymers (see copending application Ser. No. 402,341, filed Oct. 7, 1964 now abandoned). This present invention concerns further improvements in methods of conducting such curing operations by modifying and controlling the curing rate and ultimate degree with acidic compounds.

Objects

A principal object of this invention is the provision of improvements in curing of carboxyl polymers with multiaziridino compounds. Further objects include the provision of:

(1) New methods of modifying the rate and/or degree of cure of carboxyl polymers with multiaziridino compounds.

(2) New methods improving controlled cross-linking or chain extension and combinations thereof in carboxyl polymers.

(3) Methods of producing rubbery compositions from carboxyl polymers with problems of physical property instability and change with time minimized or eliminated.

(4) New carboxyl polymer compositions offering control in levels of temperature, rate and/or degree of cure with multiaziridino compounds.

(5) New methods of curing carboxyl polymers with multiaziridino compounds which decrease the possibility of undesirable side reactions.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the invention

The stated objects are accomplished in accordance with the invention by conducting the reaction of a polycarboxyl containing polymer and a multiaziridinyl hydrocarbon in the presence of an acidic catalyst.

Suitable acidic catalysts for the new methods include Lewis acids, Bronsted acids, salts of weak bases and strong acids, and organic esters of strong mineral acids.

The new methods are contemplated for use generally with both liquid and solid polymers that contain a plurality of carboxyl groups. Advantageously, the methods are applied to carboxyl terminated polyalkadienes and carboxyl polyesters. The carboxyl diolefin polymers may be hydrogenated to reduce unsaturation and may include copolymers with styrene and other copolymerizable monomers. The processes of the invention may also be used to cure copolymers, terpolymers, and the like of acrylic acid or methacrylic acid with butadiene, isoprene, acrylonitrile, styrene, methyl methacrylate, butyl acrylate and so forth. Carboxyl containing copolymers of maleic anhydride and other copolymerizable vinyl monomers can also be used as well as carboxyl terminated polyesters prepared by the condensation of an excess of a di- tri and polycarboxylic acid and a minor amount of a diol, triol or other polyol (glycol, glycerol, pentaerythritol, etc.) and mixtures thereof.

The multiaziridines used as the active curing agents in the new methods can be represented by the following general formula:

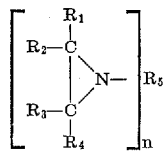

wherein $R_1$, $R_2$, $R_3$ and $R_4$ are monovalent radicals that may be the same or different selected from the group hydrogen, 1 to 5 carbon alkyl and 1 to 5 carbon alkenyl,
$R_5$ is a multivalent hydrocarbon radical containing 2 to 24 carbon atoms, and
$n$ is an integer from 2 to 4.

Within the class of multiaziridines as represented by the foregoing formula, it has been found that use of the acidic catalysts is particularly advantageous in curing of carboxyl containing polymers with two specific groups of polyaziridinyl hydrocarbons, namely, compounds having the formula:

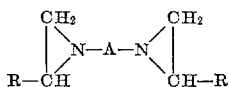

wherein

A is a 4 to 6 carbon atom saturated or unsaturated aliphatic radical, and
R is hydrogen or 1 to 3 carbon atom alkyl,
and compounds having the formula:

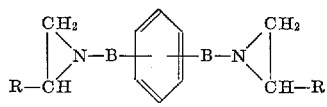

wherein

R is 1 to 3 carbon alkly, and
B is an alkylene radical containing 1 to 6 carbon atoms.

The temperature at which the polycarboxy organic compound and the multiaziridino compound are reacted is not narrowly critical and can range from 20° to 150° C. or even higher. Preferably, the temperature should be in the range of from 25° C. to about 80° C. in order for the reaction to take place at a sufficiently rapid rate and yet not be at a temperature at which the resulting polymer is adversely affected.

The amount of acidic catalyst employed can be varied. Advantageously, it will be from 0.01 to about 5 parts by weight to 100 parts by weight of the combined polycarboxylic organic compound and the multiaziridino compound. Advantageously, the multiaziridine will be present in about 1 to 10% by weight of the reaction mixture and preferably 1 to 10 parts of the multiaziridine will be used for each 100 parts of the carboxyl containing polymer.

Success of the invention is due in part to the discovery that the rate of cure of carboxyl containing polymers with multiaziridino compounds can be controlled by use of acidic catalysts to produce a unique combination of properties, specifically, improved elastomeric characteristics in combination with a hardness and gel content in the final polymer products. As a result the cured polymers can be made useful for gaskets, seals, potting compounds, metal coatings, films, rug backings and rocket binders. In the case of dicarboxyl polybutadiene, curing procedures of the invention produce soft rubber with a unique combination of gel content, hardness and plasticity.

It has been found that by the addition of the acid compound to the mixture of the multiaziridinyl alkyl aromatic compound and the polycarboxy organic compound, the rate of reaction is greatly increased. In addition to the increase in the rate of reaction, it has been found that the reaction is also more complete and therefore, the physical properties of the composition change very little with time. It has also been found that the temperatures necessary to effect the reaction are greatly reduced thereby decreasing the possibility of undesirable side reactions.

It is a further discovery of the invention that acidic catalysts are particularly effective in the curing of carboxyl polymer with diaziridinyl alkanes, i.e., the use of acid catalysts gives nearly twice the gel content in the resulting soft cured rubbers. Harder cured polymers are obtained using diaziridinyl alkenes and diaziridinyl alkyl benzenes with the acidic catalysts.

A preferred embodiment of the invention useful in forming binders for rocket propellants, which should be soft and cure slowly to completion at low temperatures, involves the use of the acidic catalysts with carboxyl terminated polybutadiene cured with aziridino compounds of the formulae:

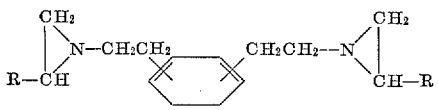

wherein R is methyl or ethyl

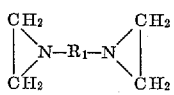

wherein $R_1$ is alkylene of 4 to 6 carbon atoms.

Advantageously with cured rubbers of this type, one can use the aziridino curing agent over a range of 0.90–1.30 equivalents per equivalent of carboxyl content of the polymer with about 5–10% of acidic catalyst by weight of the curing agent.

Description of preferred embodiments

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

EXAMPLE 1

A carboxy-terminated polybutadiene (200 parts) acid number 0.3763 milliequivalent/gram, molecular weight 5170) was weighed into a container. Bis[β (N-propylenimino) ethyl]benzene, 12 parts (10.2 meq., 33% excess) and stannic chloride (approximately 0.5 part) was added and the mixture stirred for ten minutes. The mixture was then poured into molds and cured for four days at 80° C. in an oven. The molded samples had the following physical properties:

Shore 00 Hardness _____ 83
Williams plasticity _____ 250

NOTE: The shore 00 Hardness was a reading obtained on the bottom of the molded disc. The Williams plasticity was obtained employing plugs which were cut to weigh 1.00 gram ±.01 gram.

EXAMPLE 2

The procedure generally described in Example 1 was repeated with varied reagents, conditions and results as reported in the following table:

TABLE I

| Item | 2A | 2B | 3A | 3B | 4A | 4B | 4C | 5A | 5B | 5C | 5D | 6A | 6B | 7A | 7B |
|---|---|---|---|---|---|---|---|---|---|---|---|---|---|---|---|
| Polymer | a2 | a2 | a3 | a3 | a2 | a2 | a2 | a4 | a4 | a4 | a4 | a4 | a4 | a5 | a5 |
| Polymer Wtg | 164 | 202 | 207 | 203 | 160 | 151 | 152 | 150 | 152 | 155 | 160 | 154 | 150 | 167 | 158 |
| Acid No | 376 | 376 | 375 | 375 | 376 | 376 | 376 | 373 | 373 | 373 | 373 | 373 | 373 | 312 | 312 |
| Mol. Wtg | 5,170 | 5,170 | 5,375 | 5,375 | 5,170 | 5,170 | 5,170 | 6,040 | 6,040 | 6,040 | 6,040 | 6,040 | 6,040 | 6,350 | 6,350 |
| Catalyst | None | None | None | b3 | b4 | b5 | b6 | b7 | b8 | b9 | b10 | b3 | None | b3 | b3 |
| Cat. Wtg | None | None | None | 0.5 | 1.0 | 0.5 | 0.5 | 1.0 | 1.0 | 1.0 | 1.0 | 1.0 | None | 1.0 | 0.5 |
| Azirid. Cpd | c2 | c2 | c3 | c3 | c2 | c2 | c2 | c4 | c4 | c4 | c4 | c2 | MAPO | c2 | c2 |
| Az. Cpd. Wtg | 8.4 | 11.8 | 10.3 | 10.0 | 9.0 | 8.4 | 8.5 | 9.6 | 9.9 | 10.7 | 10.2 | 10.1 | 4.1 | 8.3 | 7.8 |
| Cure Time | 4 | 4 | 4 | 4 | 4 | 4 | 4 | 3 | 3 | 3 | 4 | 3 | 4 | 4 | 4 |
| Cure Temp | 80 | 80 | 80 | 80 | 80 | 80 | 80 | 80 | 80 | 80 | 80 | 80 | 80 | 80 | 65 |
| Hardness | 59 | 40 | 29 | 85 | 87 | 68 | 75 | 45 | 58 | 38 | 86 | 86 | 71 | 89 | 85 |
| Plasticity | 141 | 88 | 87 | 258 | 270 | | | 148 | | | 256 | 266 | 212 | 314 | 276 |
| Gel Content | 70 | 67 | 66 | 91 | 94 | | | | | | 88 | 88 | 83 | 97 | 92 |

In Table I the column headings 2A through 7B refer to individual test compositions reported thereunder.

The designations under the column heading "Item" have the following meaning:

"Polymer"—particular batch of carboxyl-terminated polybutadiene polymer

"Polymer Wtg."—weight in parts of polymer used in composition

"Acid No."—acid number of the polymer in milliequivalents/g.×1000

"Mol. Wtg."—molecular weight of the polymer

"Catalyst"—the particular catalyst used, i.e.,:
  b3—BF$_3$-etherate
  b4—dimethyl sulfate
  b5—aluminum chloride
  b6—sulfuric acid
  b7—BF$_3$-pyridine complex
  b8—BF$_3$-piperidine complex
  b9—BF$_3$-trimethylamine complex
  b10—BF$_3$-dibutyl Carbitol complex "Cat. Wtg."—weight in parts of catalyst used "Azirid. Cpd."—the particular aziridino compound used, i.e.:
  c2—bis[β-(N-butylenimino)ethyl]benzene
  c3—bis[β-N-propylenimino)ethyl]benzene
  c4—bis[β-(N-butylenimino)isopropyl]benzene
  MAPO—tris(N-ethylenimino phosphine oxide "Az. Cpd. Wtg"—weight in parts of aziridino compound "Cure Time"—number of days of cure "Cure Temp."—cure temperature ° C.

"Hardness"—Shore 00 Hardness

"Plasticity"—Williams Plasticity (see below)

"Gel Content"—in percentage (see below)

EXAMPLE 3

The procedure of Example 2 was extended as reported in the following table:

TABLE II

| Item | 8 | 9A | 9B | 9C | 9D | 9E | 10A | 10B | 10C | 10D | 10E |
|---|---|---|---|---|---|---|---|---|---|---|---|
| Polymer | a6 | a4 | a4 | a4 | a4 | a4 | a4 | a4 | a4 | a4 | a4 |
| Polymer Wtg | 161 | 158 | 168 | 165 | 165 | 541 | 172 | 154 | 150 | 147 | 155 |
| Acid No | 386 | 373 | 373 | 373 | 373 | 373 | 373 | 373 | 373 | 373 | 373 |
| Mol. Wtg | 4,825 | 6,040 | 6,040 | 6,040 | 6,040 | 6,040 | 6,040 | 6,040 | 6,040 | 6,040 | 6,040 |
| Catalyst | b3 | b3 | b3 | b3 | b3 | b3 | b3 | b3 | b3 | b3 | b3 |
| Cat. Wtg | 1.0 | 1.0 | 1.0 | 1.0 | 1.0 | 1.0 | 1.0 | 1.0 | 1.0 | 1.0 | 1.0 |
| Azirid. Cpd | c2 | c4 | c4 | c4 | c4 | c4 | c4 | c4 | c4 | c4 | c4 |
| Az. Cpd. Wtg | 9.1 | 9.6 | 10.7 | 10.9 | 11.4 | 10.9 | 8.6 | 8.5 | 8.7 | 8.9 | 9.9 |
| Cure Time | 12 | 4 | 4 | 4 | 4 | 4 | 4 | 4 | 4 | 4 | 4 |
| Cure Temp | 40 | 80 | 80 | 80 | 80 | 80 | 80 | 80 | 80 | 80 | 80 |
| Hardness | 76 | 83 | 82 | 83 | 82 | 83 | 78 | 80 | 78 | 82 | 82 |
| Plasticity | 189 | 235 | | 238 | 241 | 247 | 234 | 235 | | 238 | |
| Gel Content | 83 | 87 | 86 | 87 | 85 | 87 | | | | | |

Compositions 9A–9E represent a 10–30% excess of aziridino compound in 5% increasing increments. In composition 10A, 90% of equivalent aziridino compound was used, in 10B—100%, in 10C—105%, in 10D—110%, and in 10E—115%.

In Table II, the column designations have the meanings delineated for Table I.

EXAMPLE 4

A series of formulations 11A–11C were made to investigate effect of catalyst concentration on properties of the cured polymer and another series 12A–12E to investigate effect of various curing agents with constant catalyst as reported in the following table:

TABLE III

| Item | 11A | 11B | 11C | 12A | 12B | 12C | 12D | 12E |
|---|---|---|---|---|---|---|---|---|
| Polymer | a4 | a4 | a4 | a7 | a7 | a7 | a7 | a7 |
| Polymer Wtg | 162 | 158 | 153 | 175 | 179 | 167 | 172 | 172 |
| Acid No | 373 | 373 | 373 | 317 | 317 | 317 | 317 | 317 |
| Mol. Wtg | 6,040 | 6,040 | 6,040 | 6,350 | 6,350 | 6,350 | 6,350 | 6,350 |
| Catalyst | b3 | b3 | b3 | b3 | b3 | b3 | b3 | None |
| Cat. Wtg | 1.0 | 5.0 | 10.0 | 1.0 | 1.0 | 1.0 | 1.0 | None |
| Azirid. Cpd | c4 | c4 | c4 | c5 | c3 | c2 | MAPO | MAPO |
| Az. Cpd. Wtg | 10.3 | 10.0 | 9.8 | 6.9 | 7.9 | 8.3 | 3.8 | 3.8 |
| Cure Time | 4 | 4 | 4 | 4 | 4 | 4 | 4 | 4 |
| Cure Temp | 80 | 80 | 80 | 80 | 80 | 80 | 80 | 80 |
| Hardness | 83 | 72 | 30 | 44 | 89 | 89 | TS | 73 |
| Plasticity | 242 | 178 | 73 | 134 | 298 | 314 | TS | 220 |
| Gel Content | 87 | 73 | 15 | 76 | 96 | 97 | TS | 85 |

Composition 12D was too soft to measure the value hardness, etc. (indicated by the symbol "TS").

Comparison of compositions 12D and 12E shows that with the aziridinyl phosphine oxides, acidic catalysts have a deleterious effect.

In Table III, the column designations have the meanings delineated for Table I and c5 designates bis[β-(N-ethylenimino)ethyl]benzene.

EXAMPLE 5

A series of test compositions was prepared as reported in the following Table IV. Preparation of these compositions first involved weighing the polymer and aziridino curing agent into a mixing container followed by stirring for 5–10 minutes. Catalyst, when used, was added during the mixing. The compositions after mixing were cast into glass plug molds and polyethylene disc molds and cured for four days at 80° C. After curing, physical properties as reported were determined on the cured specimens. Hardness was determined on the bottom of the molded discs using a Shore 00 durometer. The same dicarboxy polybutadiene polymer was used in all the compositions.

TABLE IV

| Item | 13 | 14 | 15 | 16 | 17A | 17B | 18A | 18B | 19A | 19B |
|---|---|---|---|---|---|---|---|---|---|---|
| Polymer Wtg | 148 | 141 | 156 | 214 | 197 | 197 | 231 | 231 | 246 | 246 |
| Catalyst | None | None | b11 | None | None | b11 | None | b11 | None | b11 |
| Cat. Wtg | None | None | 1.0 | None | None | 2.0 | None | 2.0 | None | 2.0 |
| Azirid. Cpd | c6 | c6 | c6 | c6 | c7 | c7 | c8 | c8 | c9 | c9 |
| Az. Cpd. Wtg | 4.3 | 6.1 | 5.5 | 7.4 | 7.9 | 7.9 | 11.7 | 11.7 | 11.7 | 11.7 |
| Az. Cpd. Eqv | 100 | 150 | 120 | 120 | 100 | 100 | 100 | 100 | 100 | 100 |
| Hardness | | | | | 23 | 64 | 38 | 78 | 27 | 80 |
| Plasticity | | | | | | 207 | | 283 | 79 | 293 |
| Gel Content | 23 | 27 | 45 | 20 | 53 | 78 | 60 | 86 | 54 | 89 |

In Table IV the column designations are as indicated for Table I with the following additions:

b11—BF$_3$ etherate (48% in diethyl ether)
c6—1,4-di(N-ethylenimino)butane
c7—1,4-di(N-butylenimino)butene-2
c8—o-bis(N-butyleniminomethyl)benzene
c9—p-bis(N-propyleniminomethyl)benzene
"Az. Cpd. Eqv."—percentage of equivalent of aziridino compound per polymer carboxyl equivalent.

EXAMPLE 6

The procedure of Example 5 was repeated with another series of test compositions as reported in the following table:

TABLE V

| Item | 20A | 20B | 21 | 22 | 23 | 24A | 24B | 25A | 25B | 25C | 25D | 25E |
|---|---|---|---|---|---|---|---|---|---|---|---|---|
| Polymer Wtg | 180 | 180 | 150 | 99 | 95 | 137 | 131 | 133 | 131 | 142 | 146 | 148 |
| Catalyst | None | b11 | b11 | b11 | b11 | None | None | b10 | b4 | b12 | b6 | b13 |
| Cat. Wtg | None | 2.0 | 1.0 | 0.5 | 0.5 | None | None | 1.0 | 1.0 | 1.0 | 1.0 | 1.0 |
| Azirid. Cpd | c8 | c8 | c8 | c8 | c8 | c8 | c8 | c8 | c8 | c8 | c8 | c8 |
| Az. Cpd. Wtg | 8.6 | 8.6 | 8.7 | 4.5 | 6.2 | 6.4 | 7.6 | 7.7 | 7.6 | 8.3 | 8.4 | 8.6 |
| Az. Cpd. Eqv | 100 | 100 | 115 | 90 | 130 | 100 | 115 | 115 | 115 | 115 | 115 | 115 |
| Hardness | TS | 80 | 80 | 77 | 78 | 50 | 16 | 75 | 73 | 76 | 69 | 68 |
| Plasticity | | | 281 | 265 | 294 | 135 | TS | 254 | 256 | 272 | | 272 |
| Gel Content | 53 | 90 | 88 | 85 | 88 | 63 | 44 | 84 | 87 | 85 | 67 | 85 |

In Table V the column designations are as in Tables I–IV with the following additions:

b12—stannic chloride
b13—diethyl sulfate

The gel content of the polymers in the examples was determined as follows:

A 0.3 gram sample of the polymer was cut into pieces approximately one mm.$^3$. The sample is weighed to the nearest 1/10 milligram and placed in a flask. Reagent grade benzene (100 milliliters) is pipetted into the flask and the flask tightly stoppered. The flask is placed in the dark for 24 hours and then removed and shaken to effect mixing. The solution is filtered through dry filter paper to remove the undissolved portions. An aliquot of the filtrate is then taken and evaporated to dryness and dried to a constant weight in an 80° C. vacuum oven. The percent gel is calculated as the original weight of the sample minus the weight of the residue times 100 divided by the original weight of the sample.

In making the above calculation, it must be remembered that proper consideration must be given to the fact that an aliquot is used to determine the residue.

The plasticity was determined by a test in which a small plug of cured rubber is cut to weigh approximately 1 gram in such a manner as to keep the surface as flat as possible. The sample is then placed between two sheets of paper and inserted into a Williams plastometer. The top plate is lowered quickly on the sample until contact is made. The plate is then lowered slightly and carefully while the sample is being compressed. After three minutes, the dial is read.

Discussion of details

The amounts of the reagents employed in producing compositions in accordance with this invention are not narrowly critical. The amount of the multiaziridino compound employed should be such that there is present at least one aziridinyl group for each carboxyl group present in the polycarboxy organic compound employed. Where less than one aziridinyl group is present for each carboxy group in the composition, the resulting cured composition does not have the best physical properties, that is, tensile, plasticity, and the like. It is preferred to employ the multiaziridino compound in about 15% excess over that necessary to react with the carboxyl groups of the polycarboxy organic compound employed, that is, for each carboxyl group (COOH) in the polycarboxy compound, it is preferred to employ sufficient polyaziridinyl compound so that there is slightly more than one aziridinyl group

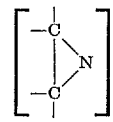

for each carboxy group.

A variety of acidic compounds are useful as curing catalyst in this invention. Particularly useful classes of materials include Bronsted acids, that is, species which tend to give up an electron such as hydrochloric acid, perchloric acid, sulfuric acid, oxalic acid, acetic acid, trifluoroacetic acid, phosphoric acid, phosphonic acid, sulfonic acid, and the like; Lewis acids, that is, species capable of accepting a pair of electrons to form a covalent bond, for example, boron trifluoride, stannic chloride, zinc chloride, ferric chloride, aluminum chloride, titanium tetrachloride, stannous chloride, aluminum tribromide, antimony pentachloride and the like, and other materials exhibiting acid reaction, for example, dimethyl sulfate, diethyl sulfate, methyl sulfate, salt of strong acids with weak bases such as aniline hydrochloride, biphenyl amine hydrochloride and the like, and phosphorous trichloride and penta chloride and the like. Complexes of these materials with organic solvents or the like can also be used, e.g., BF$_3$ etherate, or similar complexes with pyridine, piperidine, triethylamine, etc.

The procedures of the invention have been found particularly useful with multiaziridinyl hydrocarbons in curing carboxyl containing polymers. Such compounds containing olefinic unsaturation in a bridging acyclic hydrocarbon group and aryl aziridines which are alkyl substituted in the aziridinyl group are particularly interesting.

Specific examples of multiaziridino alkanes or alkenes which may be advantageously used include:

1,4-di-(N-ethylenimino)butane
1,5-di-(N-ethylenimino)pentane
1,4-di-(N-butylenimino)butene-2
1,6-di-(N-ethylenimino)hexane
1,5-di-(N-ethylenimino)-3-(N-ethyleniminomethyl)-pentane
3-methylene-1,5-di-(N-ethylenimino)pentane
1,5-di-(N-ethylenimino)pentadiene-1,4
1,4-di(2-methyl, 3-amylaziridino)butane.

With respect to multiaziridino methylene benzenes, suitable examples of compounds include:

p-bis-(N-butyleniminomethyl)benzene
p-bis-(N-ethyleniminomethyl)benzene
o-bis-(N-butyleniminomethyl)benzene
p-bis-(N-propyleniminomethyl)benzene
p-bis-(2,3-dimethylaziridinomethyl)benzene
m-bis-(2-methyl,3-amylaziridinomethyl)benzene
1,2,4-tris-(N-butyleniminomethyl)benzene
1,3-bis-(N-butyleniminomethyl)naphthalene
1,2,4,6-tetra-(N-ethyleniminomethyl)benzene
1,2,8-tris-(N-propyleniminomethyl)naphthalene.

Illustrative of additional multiaziridinyl aryl compounds which can be employed in producing the compositions of this invention are, for example, the ortho, meta or para isomers of:

bis-(N-ethyleniminoethyl)benzene
bis-(N-ethyleniminoisopropyl)benzene
bis-(N-propyleniminoethyl)benzene
bis-(N-propyleniminoisopropyl)benzene
bis-(N-butyleniminoethyl)benzene
bis-(N-butyleniminoisopropyl)benzene
bis-(N-ethyleniminoethyl)naphthalenes
bis-(N-ethyleniminoisopropyl)naphthalenes as well as:

bis-(N-ethyleniminoethyl)naphthalenes
bis-(N-ethyleniminoisopropyl)naphthalenes
bis-(N-butyleniminoethyl)naphthalenes
bis-(N-ethyleniminoethyl)biphenyls;
and the like.

Examples of the aromatic nuclei which $R_5$ represents in the general formula given hereinbefore include the di-, tri-, and tetra-valent groups derived from benzene, toluene, ethyl benzene, naphthalene, anthracene, diphenyl, phenanthrene, terphenyl, xylene and their alkyl substituted derivatives and the like. It is understood, of course, that alkyl substituted aromatic compounds such as mesitylene (trimethyl benzene) could only be a di- or tri-valent group, and durene (tetramethyl benzene) could only be divalent.

Various methods are known for preparing aziridines of the foregoing type including any general methods for the preparation of multiaziridines now known or hereinafter developed. As an example of one method, multiaziridines may be prepared by reaction of compounds containing olefinic unsaturation with ethyleneimine or its alkyl substituted counterparts. A preferred method of preparing the new aziridino compounds is reaction of ethyleneimine with a halogenated hydrocarbon as illustrated in the copending application Ser. No. 402,341 now abandoned.

In place of ethyleneimine, one can use

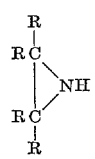

where R is a hydrogen or a lower (1–5 carbon atoms) alkyl or alkenyl group (methyl, propyl, allyl, crotyl, etc.). As an example of halogenalkane, there is 1,4-dibromobutane, but one can use a compound such as $[R'+X_n$ where R' is a branched or linear aliphatic hydrocarbon chain, has from 2 to 16 carbon atoms and can be saturated or ethylenically unsaturated, X is a halogen and n is a number from 2 to 6, preferably from 2 to 3.

For preparation of the aziridino aromatic compounds, bis-chloromethyl benzene may advantageously be used. However, one can use a compound such as

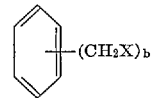

where X is a halogen and b is a number from 2 to 3 and the substituent may be on any position of the aromatic ring. Monocyclic compounds are preferred, but use of polycyclic compounds is contemplated, i.e., corresponding compounds in which the benzene group is replaced by naphthalene, anthracene, biphenyl, terphenyl, diphenyl-methane, -ethane, etc., triphenyl-methane, etc. The H on the aromatic nuclei can be partially or entirely replaced with lower (C1–C5) alkyl groups.

Polycarboxy organic compounds useful in producing the compositions of this invention are those polycarboxy organic compounds containing at least two carboxyl groups. These polycarboxylic organic compounds have the general formula:

$$\text{HOOC—R'—(COOH)}x$$

wherein x is an integer having a value of 1, 2, or 3 and R' is an organic moiety having a valence of $(x+1)$, such organic moieties being those derived from polybutadienes, polyesters, long chain alkanes, polyisoprene, polyethers, and the like.

These polycarboxy organic compounds are, for example, carboxy terminated polybutadienes, carboxy terminated polyesters, long chain polycarboxylic acids and dimmer acids such as, for example, dimerized polyunsaturated acids such as linoleic and the like, copolymers of butadiene and methacrylic acid, butadiene-acrylonitrile-acrylic acid terpolymers, butadiene-styrene-acrylic acid terpolymers and the like.

The polycarboxy containing polymers which are especially useful in producing the solid propellants of this invention comprise carboxy containing polymers produced from a number of starting materials. These starting materials include conjugated dienes containing from 4 to 8 carbon atoms, such as, for example, piperylene, isoprene, 1,3-hexadiene, butadiene, methylpentadiene, 1,3-octadiene, 3,4-dimethyl hexadiene-1,3, chloroprene, fluoroprene, and the like.

The carboxy containing polymers also include copolymers of the above dienes with other olefin monomers, such as, for example, styrene and alkyl styrenes, vinylnaphthalene, vinyltoluene, and the like; olefinically unsaturated heterocyclic nitrogen compounds such as, 2-vinylpyridine, 3-vinylpyridine, 4-vinylpyridine, 3,5-diethyl-4-vinylpyridine, 3-ethyl-5-vinylpyridine, 2-methyl-5-vinylpyridine, and the like and di-substituted alkenyl pyridines, quinolines, and the like; the acrylic acids and their esters, such a methacrylic acid, acrylic acid, maleic acid, methyl methacrylate, ethyl methacrylate, propyl methacrylate, butyl methacrylate and the like; methyl vinyl ether, vinyl chloride, vinylfuran, vinylcarbazole and the like.

The above dienes and the olefinic monomers can be polymerized or co-polymerized by a free radical mechanism to yield carboxy containing polymers when one of the monomeric substitutes is acrylic acid or maleic acid, and the like.

The carboxy containing polymers can also be prepared by reacting di-alkali organo compounds with dienes such as butadiene and subsequently with carbon dioxide to yield carboxy terminated polymers such as carboxy terminated polybutadiene.

The molecular weight of the polycarboxylic organic compound employed greatly affects the properties of the chain extended and cross-linked polymers produced according to this invention. For example, when low molecular weight polycarboxylic organic compounds are employed, that is, molecular weights below about 1000, hard resinous compositions are obtainned. This type of reactants can be employed as a method of encapsulating fragile electronic parts and the like. When polycarboxylic organic compounds having molecular weights of 5000 are employed to produce the compositions of this invention the products are more rubbery. These rubbery type reaction products are useful as propellant binders in producing solid rocket propellants.

In the formation of elastomeric compositions or other reaction mixtures, between multiaziridines and carboxyl containing polymers in accordance with the invention, various reaction conditions may be employed. These will depend, to some extent, upon particular polymers which are cured with the multiaziridines and additional compounding or modifying agents which might be incorporated in the compositions. Advantageously, the curing reaction is conducted at a temperature between 25 and 175° C. for between 0.25 and 96 hours, generally shorter times being employed the higher the temperature. A temperature range of 35 to 80° C. is preferred for making rocket propellants. A preferred range of curing times and temperatures is 15–60 minutes at 135–165° C. for molded rubber products. Usually the curing operation will take place while the multiaziridine/polymer mixture is being suitably shaped, e.g., cast in molds, extruded through dies, calendered or cast into films or the like.

Useable products can be formed by mixtures which consist solely of the multiaziridine, the carboxyl containing polymer and the acidic catalyst. Mixtures of two or more of these basic reactants may advantageously be employed. Also, additional compounding agents commonly employed in rubber and polymer fabrication may be incorporated. Such added materials which may typically constitute 1–75% and preferably 5–50% of the total composition including the multiaziridine and the carboxyl containing polymer. Examples of such additional materials include fillers or pigments, e.g., carbon black, chalk, zinc oxide, barium sulfate, titanium dioxide, chromium oxide and the like; fire retardants, e.g., polychloroaromatic compounds, zinc borate, antimony sulfides and the like; light stabilizers; antioxidants; plasticizers, e.g., dialkyl phthalates, fatty acid esters, etc.; heat stabilizers, mold release lubricants and the like.

Oxidants which are applicable in the practice of preparing solid rocket propellants using acidic catalysts in accordance with the invention are those oxygen-containing solids which are employed as oxidizing agents and/or which readily give up oxygen. They include ammonium nitrate and other ammonium and alkali metal compounds such as potassium and sodium perchlorates, chlorates, chlorites, and hypochlorites. Dichromates, chromates, chromites, and persulfates are also applicable. Although ammonium, potassium and sodium salts are preferred, salts of other metals such as lithium, calcium, strontium, barium, magnesium, aluminum, boron, and the like, can also be used. The oxidants which are preferred are ammonium nitrate and potassium, sodium and ammonium perchlorates. In the preparation of the solid rocket propellant compositions, the oxidants are powdered to sizes preferably finer than about 200 mesh. The amount of solid oxidant employed is usually a major amount of the total composition and is generally in the range between 50 and 90 percent by weight of the total mixture. If, desired, however, less than 50 percent by weight of the oxidant can be used.

Commonly used combustion rate catalysts are metal ferrocyanides and ferricyanides. Ferric ferrocyanides such as Prussian, Berlin, Hamburg, Chinese, Paris, and Milori blue, soluble Berlin or Prussian blue which contains potassium ferric ferrocyanide, and ferric ferrocyanide which has been treated with ammonia, are among the materials which can be used. Ferrous ferricyanide or Turnbull's blue is also applicable. Other metal compounds such as nickel and copper ferrocyanides can also be employed.

The amount of burning rate catalysts used in the propellant compositions will usually be in the range from 1 to 60 parts per 100 parts of rubbery polymer with from 5 to 50 parts being most frequently preferred.

The compositions are cured at temperatures generally in the range between 25 and 175° C. The curing temperature employed is determined, at least in part, by the solid oxidant used. For example, when a nitrate such as ammonium nitrate is used as the oxidant, curing is generally effected at lower temperature than when the oxidant is ammonium perchlorate. The curing agent of this invention is particularly effective at the lower temperatures. As an illustration, useable curing rates can be obtained at temperatures between 35 and 80° C. when using acidic catalysts with the multiaziridines as hereinbefore defined. Curing at these relatively low temperatures has certain advantages. The safety factor is important and obviously the hazards are less when operating at low temperatures. Another advantage is that there is no phase change in ammonium nitrate below these temperatures, and therefore, there is less tendency for cracking of the composition to occur during the curing process.

Conclusion

There has been described in sufficient detail contemplated to enable those skilled in the art to make and use the invention, new improvements in process of curing carboxyl containing polymers. Examples of various reagents and conditions employed using acidic catalysts to modify curing of carboxyl containing polymers with multiaziridino hydrocarbon compounds have been given. The resulting elastomeric products possess unique combinations of hardness, gel content and plasticity rendering them particularly useful in certain indicated applications and products.

The embodiments of the invention in which an exclusive property or right is claimed are defined as follows:

1. A process of producing copolymeric products comprising:
   (A) forming a mixture of a polycarboxy polymer containing at least two carboxyl groups, and
   (B) a multiaziridine represented by the formula:

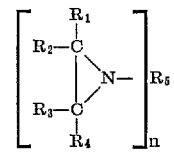

wherein $R_1$, $R_2$, $R_3$ and $R_4$ are monovalent radicals that may be the same or different selected from the group hydrogen, 1 to 5 carbon alkyl and 1 to 5 carbon alkenyl,
$R_5$ is a multivalent hydrocarbon radical containing 2 to 24 carbon atoms, and
$n$ is an integer from 2 to 4,
   (C) the amount of the multiaziridine in said mixture being between about 1 and 10 percent by weight of the total mixture and further in such amount that there is at least one aziridinyl group for each carboxyl group present in the polycarboxy polymer,
   (D) mixing therewith between about 0.01 to 5 parts of an acidic catalyst for each 100 parts of said total mixture, and
   (E) maintaining said mixture at a temperature at which said polycarboxy polymer and said multiaziridine react to form a copolymeric product.

2. A process of producing copolymeric products comprising:
   (A) forming a mixture of:

(a) a polycarboxylic containing organic compound containing at least two carboxyl groups of the formula:

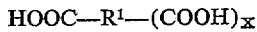

wherein
X is an integrer having a value of 1, 2 or 3 and
$R^1$ is an organic moiety having a valence of (X+1), such organic moiety being derived from a polybutadiene, a polyester, a long chain alkane, a polyisoprene or a polyether, and (b) a multiaziridine represented by the formula:

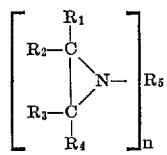

wherein
$R_1$, $R_2$, $R_3$ and $R_4$ are monovalent radicals that may be the same or different selected from the group hydrogen, 1 to 5 carbon alkyl and 1 to 5 carbon alkenyl,
$R_5$ is a multivalent hydrocarbon radical containing 2 to 24 carbon atoms, and
n is an integer from 2 to 4, (B) the amount of the multiaziridine in said mixture being between about 1 and 10 percent by weight of the said mixture and further in such amount that there is at least one aziridinyl group for each carboxyl group present in the polycarboxylic containing organic compound, (C) mixing therewith between about 0.01 to 5 parts of an acidic catalyst for each 100 parts of said mixture, and (D) maintaining said mixture at a temperature at which said polycarboxylic containing organic compound and said multiaziridine react to form a copolymeric product.

3. A process as claimed in claim 1 wherein said polycarboxy polymer is selected from the group consisting of carboxyl terminated polyalkadienes, carboxyl polyesters, copolymers of acrylic acid, copolymers of methacrylic acid, and copolymers of maleic anhydride.

4. The process of claim 1 wherein said multiaziridine is a compound of the formula:

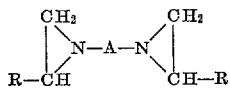

wherein
A is a 4 to 6 carbon atom alkyl or alkylene radical, and
R is hydrogen or 1 to 3 carbon atom alkyl.

5. The process of claim 1 wherein said multiaziridine is a compound of the formula:

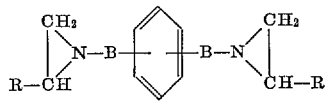

wherein
R is 1 to 3 carbon alkyl, and
B is 1 to 6 carbon alkylene.

6. The process of claim 1 wherein said polycarboxylic organic compound is dicarboxy polybutadiene.

7. The method as claimed in claim 1 wherein the acidic catalyst is a Lewis acid.

8. The method as claimed in claim 1 wherein the acidic catalyst is a boron trifluoride-amine complex.

9. The process of claim 1 wherein said reaction is conducted at a temperature between 25 and 175° C. for between 0.25 to 96 hours employing shorter times the higher the temperature.

10. The method as claimed in claim 1 wherein the multiaziridinyl alkyl aromatic compound is bis-(N-propylenimino-ethyl)benzene and the acidic catalyst is boron trifluoride etherate.

References Cited

UNITED STATES PATENTS 3,150,209  9/1964  Short et al. _____ 260—894
3,162,618  12/1964  Smith _____ 260—77.5

JOSEPH L. SCHOFER, Primary Examiner
W. HAMROCK, Assistant Examiner

U.S. Cl. X.R.

260—75, 78.5, 80.7, 80.78, 83.5, 85.1, 86.7, 87.3, 89.1, 91.1, 93.7, 94.7